(12) United States Patent
Havens et al.

(10) Patent No.: US 9,418,269 B2
(45) Date of Patent: Aug. 16, 2016

(54) LASER SCANNING INDICIA READING TERMINAL HAVING VARIABLE LENS ASSEMBLY

(75) Inventors: William H. Havens, Syracuse, NY (US); Timothy Meier, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 1312 days.

(21) Appl. No.: 12/540,075

(22) Filed: Aug. 12, 2009

(65) Prior Publication Data

US 2011/0036908 A1 Feb. 17, 2011

(51) Int. Cl.
*G06K 7/10* (2006.01)

(52) U.S. Cl.
CPC ........ *G06K 7/10881* (2013.01); *G06K 7/10811* (2013.01)

(58) Field of Classification Search
USPC ......................................................... 235/454
See application file for complete search history.

(56) References Cited

U.S. PATENT DOCUMENTS

| | | | |
|---|---|---|---|
| 4,806,776 A | 2/1989 | Kley | |
| 5,361,158 A * | 11/1994 | Tang | G06K 7/12 235/462.4 |
| 5,396,053 A * | 3/1995 | Swartz | G06K 7/10633 235/462.15 |
| 5,410,141 A | 4/1995 | Koenck et al. | |
| 5,420,411 A | 5/1995 | Salatto, Jr. et al. | |
| 5,640,001 A | 6/1997 | Danielson et al. | |
| 5,672,858 A | 9/1997 | Li et al. | |
| 5,701,001 A | 12/1997 | Sugifune et al. | |
| 6,123,264 A | 9/2000 | Li et al. | |
| 6,213,399 B1 | 4/2001 | Tsi et al. | |
| 6,478,225 B1 * | 11/2002 | Swartz | G06K 7/10633 235/462.22 |
| 6,981,642 B2 | 1/2006 | Krichever | |
| 6,991,168 B2 | 1/2006 | Tsi et al. | |
| 7,416,125 B2 | 8/2008 | Wang et al. | |

(Continued)

OTHER PUBLICATIONS

U.S. Appl. No. 12/432,434, filed Apr. 29, 2009, Inventors: William H. Havens, Chen Feng, Ynjiun P. Wang.

(Continued)

*Primary Examiner* — Michael G Lee
*Assistant Examiner* — David Tardif
(74) *Attorney, Agent, or Firm* — Additon, Higgins & Pendleton, P.A.

(57) ABSTRACT

There is described a laser scanning indicia reading terminal comprising a variable setting imaging lens having a first setting at which the terminal has a first plane of optimum focus and a second setting at which the terminal has a second plane of optimum focus. According to one embodiment a first predetermined scanning width can be associated to the first lens setting and a second scanning width can be associated to the second lens setting such that the terminal with the lens setting set to the first setting scans to a first width and with the lens setting set to a second setting scans to a second width. In addition to or in place of the scan width operational parameters different operational parameters can be associated to the respective first and second lens settings.

30 Claims, 4 Drawing Sheets

(56) References Cited

U.S. PATENT DOCUMENTS

| | | |
|---|---|---|
| 2005/0218231 A1 | 10/2005 | Massieu |
| 2006/0011724 A1 | 1/2006 | Joseph et al. |
| 2007/0063048 A1* | 3/2007 | Havens ............... G06K 7/10702 235/462.46 |
| 2007/0080280 A1 | 4/2007 | Havens |
| 2007/0102520 A1 | 5/2007 | Carlson et al. |
| 2007/0164115 A1 | 7/2007 | Joseph et al. |
| 2008/0144185 A1 | 6/2008 | Wang et al. |
| 2008/0144186 A1 | 6/2008 | Feng et al. |
| 2008/0230607 A1* | 9/2008 | Etten ................. G06K 17/0022 235/435 |
| 2008/0245872 A1 | 10/2008 | Good |
| 2009/0057413 A1* | 3/2009 | Vinogradov ........... G02B 27/20 235/462.35 |
| 2009/0072037 A1 | 3/2009 | Good et al. |

OTHER PUBLICATIONS

U.S. Appl. No. 12/432,517, filed Apr. 29, 2009, Inventors: William H. Havens, Ynjiun P. Wang.
U.S. Appl. No. 12/432,534, filed Apr. 29, 2009, Inventors: William H. Havens, Timothy P. Meier, Ynjiun P. Wang.
U.S. Appl. No. 12/540,075, filed Aug. 12, 2009, Inventors: William H. Havens, Timothy P. Meier.

* cited by examiner

LASER SCANNING INDICIA READING TERMINAL HAVING VARIABLE LENS ASSEMBLY

FIELD OF THE INVENTION

The present invention relates in general to optical based registers, and particularly, is a laser scanning based optical based register.

BACKGROUND OF THE INVENTION

Commercially available laser scanning indicia reading terminals typically include a laser light source assembly for emitting a laser beam, a scanning mechanism such as a mirror for scanning the laser beam, and a lens assembly for focusing the laser beam onto a target.

Laser scanning indicia reading terminals are available in a variety of form factors. Gun style indicia reading terminals are often provided in a form without displays and keyboards. Gun style indicia reading terminals can be provided in the shape of a gun and can include a trigger actuatable with use of an index finger. Laser scanning indicia reading terminals are also available in portable data terminal and personal data assistant (PDA) forms factors. Such form factors can be characterized by displays and control actuators, e.g., keyboards. The well known cellular phone form factor can be regarded as an example of a PDA form factor. Laser scanning indicial reading terminals are also available as form factors that can be body worn (e.g., wrist worn, hand worn, or finger worn).

Proposals have been made for increasing a reading range of laser scanning indicia reading terminals. Proposals have been made to incorporate a variable lens assembly into a laser scanning indicia reading terminal for increasing a reading range of the terminal.

SUMMARY OF THE INVENTION

There is described a laser scanning indicia reading terminal comprising a variable setting imaging lens having a first setting at which the terminal has a first plane of optimum focus and a second setting at which the terminal has a second plane of optimum focus. According to one embodiment a first predetermined scanning width can be associated to the first lens setting and a second scanning width can be associated to the second lens setting such that the terminal with the lens setting set to the first setting scans to a first width and with the lens setting set to a second setting scans to a second width. In addition to or in place of the scan width operational parameters different operational parameters can be associated to the respective first and second lens settings. Additionally or alternatively, different processes for determining an operational parameter and/or different algorithms for determining an operational parameter can be associated to each of the first and second lens settings.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
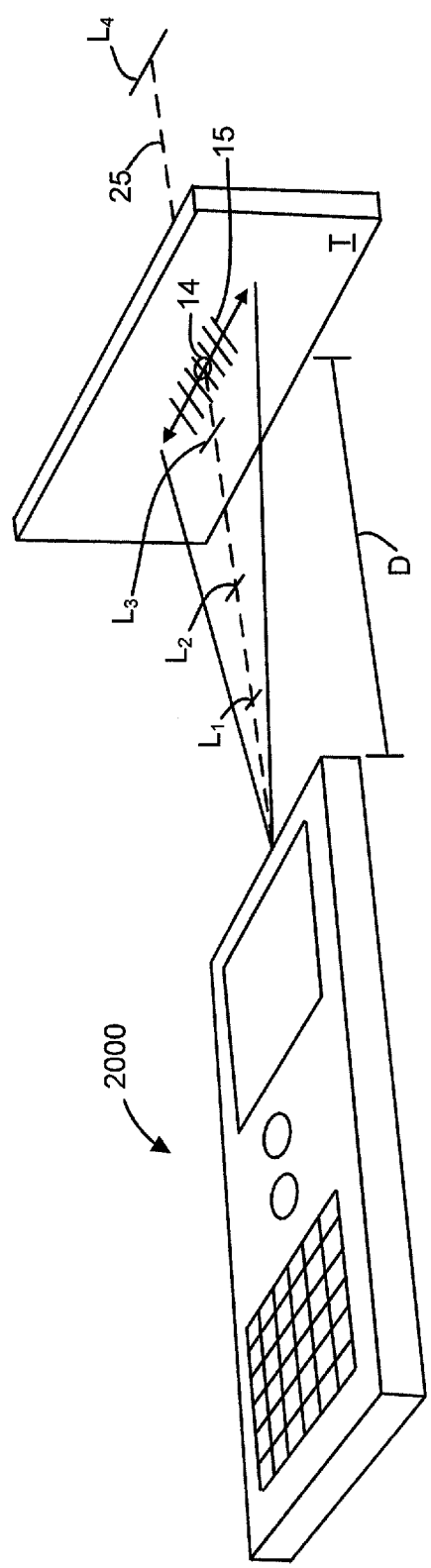
FIG. 1 is a perspective view of a laser scanning indicia reading terminal having a variable focus lens assembly in one embodiment.

There is described a laser scanning indicia reading terminal 2000 having a variable setting imaging lens assembly that includes a first setting at which the terminal has a first plane of optimum focus and a second setting at which the terminal has a second plane of optimum focus. Referring to FIG. 1, a laser scanning indicia reading terminal 2000 can be operative to project a spot 14 of laser light on a target, T, such as a substrate, e.g., a piece of paper. On the target, T, there can be disposed a decodable indicia 15 e.g., a bar code symbol. Terminal 2000 can be operative to scan spot 14. Terminal 2000 can detect returned light for generation of a scan signal and then process the scan signal for attempting to decode a decodable indicia, e.g., a bar code symbol. During reading, terminal 2000 can be positioned at a distance, D, from the target, T. By virtue of it having a variable lens assembly for focusing emitted laser light, a plane of optimum focus of spot 14 can be varied, e.g., between a first lens setting at which a plane of optimum focus is at distance $L_1$, and a second lens setting at which a plane of optimum focus is at distance $L_2$. Terminal 2000 can be operative so that additional lens settings are possible, e.g., a third lens setting at which a plane of optimum focus is defined at distance $L_3$ and a fourth lens setting at which a plane of optimum focus is defined at a farther distance, $L_4$. In theory an infinite number of lens settings including intermediate lens settings are possible.

In addition as will be described herein, terminal 2000 can be operative to have a first functionality wherein during an operator initiated decode attempt, a lens setting of a lens assembly is varied and a second functionality wherein a lens setting remains fixed during an operator activated read attempt, but which can be subject to adjustment intermediate a read attempt in response to an operator input command input to terminal 2000 between read attempts.

Terminal 2000 can be operative so that during operation when operating to attempt to decode a decodable indicia, an actual present reading distance of terminal 2000 may be spaced apart significantly from a present plane of optimum focus distance lens setting of terminal 2000. Nevertheless, at the same time as a read attempt, an actual present terminal to target distance, D, of terminal 2000 can be in proximity with a plane of optimum focus lens setting of terminal 2000. Operating in accordance with the first functionality, a varying plane of optimum focus lens setting may converge on an actual terminal to target distance during a read attempt in which a succession of scan signals is generated. Operating according to the second functionality, terminal 2000, if portable, can be moved by an operator into a position at which a current terminal to target distance is proximate the plane of optimum focus setting. Also, according to the second functionality, a substrate bearing a decodable indicia can be brought into proximity with terminal 2000 during a read attempt.

According to one embodiment, a first scanning width, which can be expressed as a scan angle, $\theta_1$, can be associated to the first lens setting and a second scanning width (angle $\theta_2$), can be associated to the second lens setting such that the terminal with the lens setting set to the first lens setting scans to a first width and the terminal with the lens setting set to a second setting scans to a second width.

In addition to or in place of the scan width operational parameter, different operational parameters can be associated to the respective first and second lens settings.

One such operational parameter is laser light source energization level; another operational parameter is amplifier gain; another operational parameter is initial laser light source energization levels; another operational parameter is initial amplifier gain.

Additionally or alternatively, different processes for determining an operational parameter and/or different algorithms for determining an operational parameter can be associated to each of the first and second lens settings. For example the bandwidth of the electrical signal processing may be changed depending upon the focus position thereby optimizing the signal to noise ratio for each focus position.

For example, a first process and/or algorithm for controlling a laser light source energization level can be active when the lens setting is at the first lens setting and a second process and/or algorithm for controlling a laser light source energization level can be active when the lens setting is at the second lens setting. Also, a first process and/or algorithm for controlling amplifier gain can be active when the lens setting is at the first lens setting and a second process and/or algorithm for controlling amplifier gain can be active when the lens setting is at the second lens setting.

In development of a variable lens setting indicia reading terminal described herein, it was determined that decoding of scan signals generated with the terminal highly out of focus (i.e., with the terminal at a terminal to target distance significantly spaced from distance corresponding to the optical focus distance of the present lens setting) will normally fail as a result of the terminal being out of focus irrespective of whether operational controls are optimized for the actual current reading distance of the terminal. Accordingly, in one embodiment, an indicia reading terminal is operative so that operational parameters of the terminal are optimized for reading distances corresponding to the plane of optimum focus of the current setting of the terminal's lens assembly.

In one embodiment, a lens setting of a terminal's lens assembly can be controlled on an open loop basis, i.e., without reference to either a ranging parameter or a focus determination or another determined condition. In such an embodiment, the terminal can be operative so that operational parameters of the terminal are optimized for reading distances corresponding to the plane of optimum focus of the current setting of the terminal's lens assembly irrespective of whether the plane of optimum focus distance of the current lens setting is proximate to the current actual terminal to target distance. Operative as described, a likelihood of successful reading and expected read time can be improved.

A hardware platform for support of operations described herein with reference to a laser scanning indicia reading terminal is shown and described with reference to FIGS. 1-4.

Figure 2:
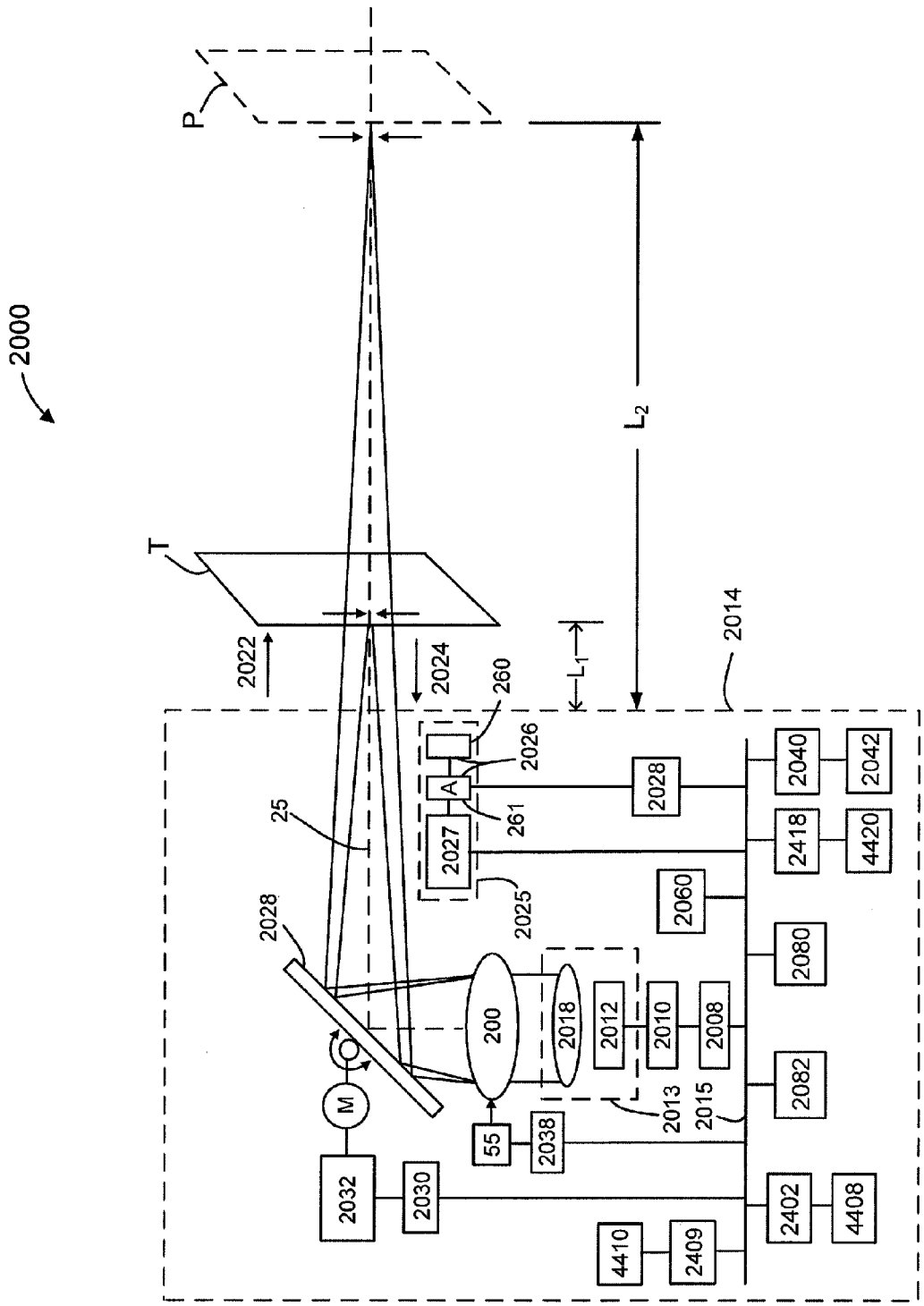
FIG. 2 is a block diagram of a laser scanning indicia reading terminal having a variable focus lens assembly in one embodiment.

Referring to FIG. 2, an indicia reading terminal 2000 can include a laser light source 2012 supported by a hand held housing 2014. The laser light source 2012 can emit a laser beam along an optical path, or axis 25. Laser light source 2012 can be coupled to laser light source control circuit 2010. Light from laser light source 2012 can be shaped by collimating optics 2018 and lens assembly 200. The combination of laser light source 2012 and collimating optics 2018 can be regarded as a laser light source assembly 2013. The laser beam travels in an emitting direction 2022 along axis 25 and illuminates a target T, which in one embodiment includes a bar code. A scanning mirror reflector 2028 disposed within the optical path defined by axis 25 oscillates to direct the laser beam across the entire surface to be scanned. Reflector 2028 can be driven by scan motor, M, which is coupled to control circuit 2032. In one example, laser light source 2012 can be provided by a laser diode. In another example, laser light source 2012 can be a gas laser.

The laser beam reflects off target T and travels along axis 25 in a receiving direction 2024 back to a detector assembly 2025. In the example wherein the target T includes a barcode, the incident laser light strikes areas of dark and white bands and is reflected. The reflected beam will thusly have variable intensity representative of the barcode pattern. Detector assembly 2025 including detector 2026 and analog to digital converter 2027 can receive the reflected beam of variable intensity, generate an analog signal corresponding to the reflected beam, and convert it to a digital signal for storage into memory 2080 where it can be processed by CPU 2060 in accordance with a program stored in non-volatile memory 2082, provided in a particular example by an EPROM. Detector 2026 can include sensor part 260 and amplifier 261.

For attempting to decode a bar code symbol, CPU 2060 can process a digitized image signal corresponding to a scanned, reflected, and detected laser beam to determine a spatial pattern of dark cells and light cells and can convert each light and dark cell pattern determined into a character or character string via table lookup. Terminal 2000 can include various interface circuits allowing CPU 2060 to communicate with various circuits of terminal 2000 including interface circuit 2008 coupled to circuit 2010 and system bus 2015, interface circuit 2030 coupled to motor control circuit 2032, interface circuit 2038 coupled to electrical power input unit 55, and interface circuit 2028 interfaced to amplifier (for adjusting a gain of amplifier 261) and to system bus 2015. Terminal 2000 can also include trigger 4408 which can be actuated by an operator to initiate a decode attempt. Manual trigger 4408 can be coupled to interface circuit 2402, which in turn can be coupled to system bus 2015. Terminal 2000 can also include a display 4420 in communication with CPU 2060 via interface 2418 as well as pointer mechanism 4410 in communication with CPU 2060 via interface 2409 coupled to system bus 2015. Terminal 2000 can also include ultrasound emitter/sensor 2042 for generating range (terminal to target distance) formation. Emitter/sensor 2042 can be coupled to system bus 2015 via interface 2040.

Referring to further aspects of indicia reading terminal 2000, terminal 2000 can include electrical power input unit 55 for inputting of energy for changing an optical characteristic of a lens element of lens assembly 200 and therefore, changing an optical characteristic (e.g., focal length, plane of optimum focus) of lens assembly 200. In one embodiment, an energy input to lens assembly 200 can be varied to vary a plane of optimum focus of a laser beam that is shaped by optics 2018, 200, and 2028. A plane (or distance) of optimum focus of a projected laser beam can be varied between a first distance $L_1$ of optimum focus and a second distance $L_2$ of optimum focus. It has been described that a lens setting of lens assembly 200 can be controlled on an open loop basis, i.e., without being responsive to a determined distance, degree of focus, or other sensed condition. Such operation can be advantageous for purposes of avoiding costs and time delays associated with range detection. In some embodiments, however, it is desirable to set a lens setting of terminal 2000 responsively to a range detection as read from range detection unit or other determined conditions. Where terminal 2000 is operative so that a lens setting is manually or dynamically varied, but without being responsive to a determined condition, it is understandable that a lens setting of terminal 2000 can at times be de-synchronized with an actual terminal to target distance. For example, at a certain time during operation of terminal 2000, an actual target may be at a terminal to target distance corresponding to the position of target T, while the plane of optimum focus corresponds to the position of plane P.

In one embodiment, lens assembly 200 can include a fluid lens, e.g., an electrowetting fluid lens comprising a plurality of immiscible fluids. A fluid lens of lens assembly 200 can be provided by an ARTIC 314 fluid lens of the type available from VARIOPTIC S.A. of Lyon, France. A fluid lens of lens assembly 200 can alternatively be a fluid lens of the type having a deformable surface, and can be provided in association with a mechanical actuator assembly coupled to power input unit. In one embodiment, lens assembly 200 comprises a single lens element, e.g., a single fluid lens. In another embodiment, lens assembly 200 comprises a plurality of lens elements, e.g., a fluid lens in combination with one or more glass or polycarbonate or additional fluid lenses. A fluid lens of lens assembly 200 can be replaced by a motor driven lens that is motor driven for movement of the motor driven lens along its optical axis.

Figure 3:
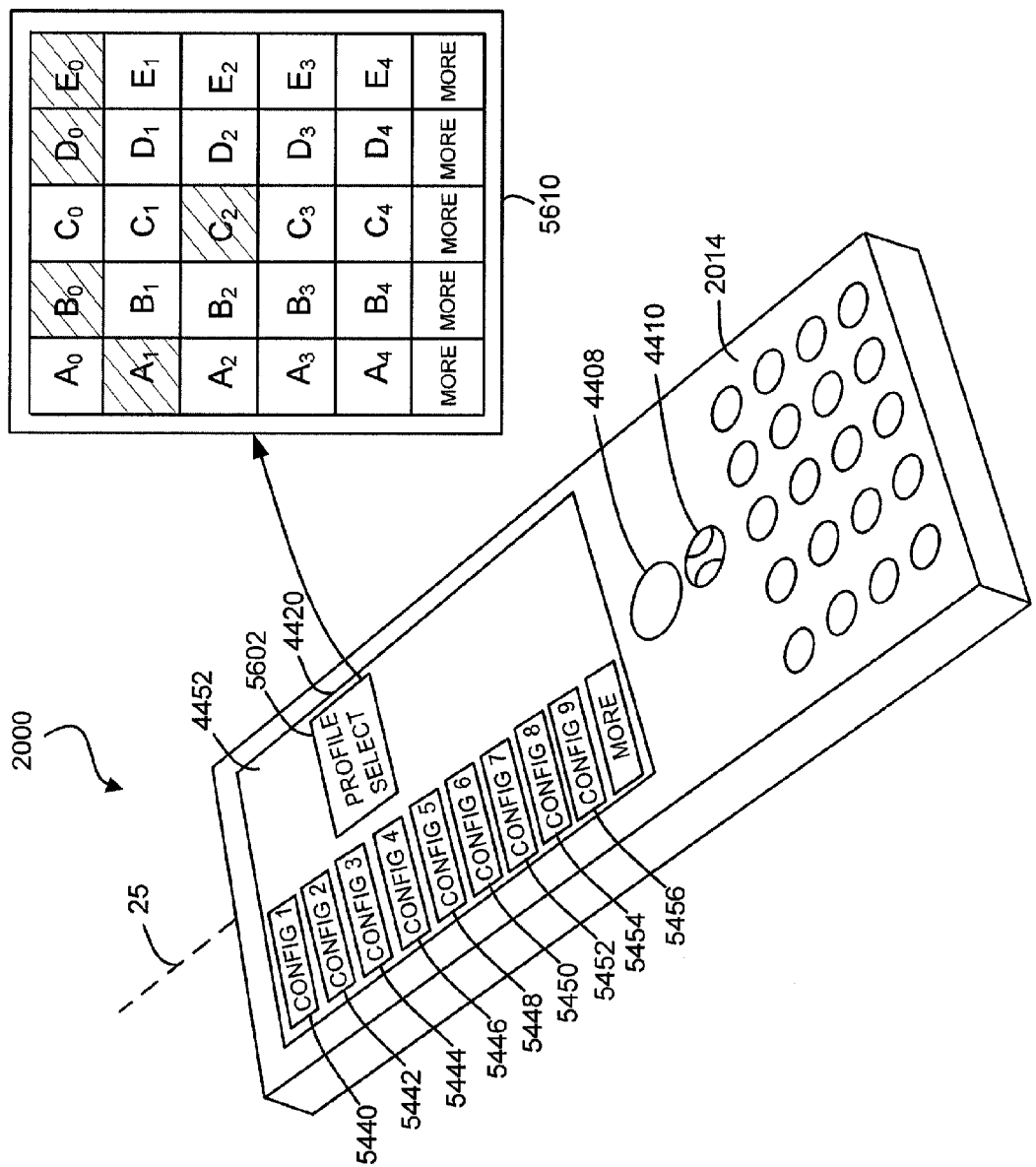
FIG. 3 is a perspective view of a laser scanning indicia reading terminal illustrating a user interface thereof in one embodiment.

A physical form view of a laser scanning based indicia reading terminal 2000 is shown in FIG. 3. Terminal 2000 can include display 4420 and trigger 4408 disposed on a common side of hand held housing 2014. A user interface of terminal 2000 can be provided by display 4420 and pointer mechanism 4410 in combination. A user interface of terminal 2000 can also be provided, e.g., by configuring terminal 2000 to be operative to be programmed by decoding of programming bar code symbols. In another embodiment, hand held housing 2014 can be devoid of a display and can include a gun style form factor.

Referring to terminal 2000, terminal 2000 can be operative to change a lens setting of lens assembly 200 between at least a first plane of optimum focus setting (a first setting) and a second plane of optimum focus setting (a second setting). At the first setting lens assembly 200 can have a first plane of optimum focus. At the second lens setting lens assembly 200 can have a second plane of optimum focus. Still further, terminal 2000 can be operative to generate at least a first signal corresponding to a first scan with the lens assembly 200 at the first setting (lens setting) and a second signal corresponding to a second scan with the lens assembly at the second setting (lens setting), and terminal 2000 can be further operative to attempt to decode a decodable indicia utilizing the first signal and/or the second signal. The second scan to which the second signal corresponds to can be a successive scan in relation to the first scan or a non-successive subsequent scan in relation to the first scan.

Terminal 2000 can be operative so that terminal 2000 can generate a succession of scans and signals corresponding to the scans when an operator activated read attempt is activated by an operator actuation of a trigger 4408. Terminal 2000 can subject one or more generated signals to a decode attempt and the scanning, signal generating, and decode attempting can continue until a read attempt is deactivated e.g., by a release of trigger 4408 or by a successful decode or expiration of a timeout.

Terminal 2000 having a first functionality described herein can be operative to change a lens setting of lens assembly 200 between at least a first and second lens setting of the lens assembly during a time that terminal 2000 executes an operator activated read attempt of the terminal, which attempt can be activated by actuation of trigger 4408. Further, terminal 2000 can be operative so that the first and second signals are generated during a single operator activated read attempt.

Indicia reading terminal 2000 in an alternative embodiment can be operative to maintain a lens setting of the terminal at a certain (fixed) lens setting during a time that the terminal executes an operator activated read attempt of terminal 2000 which can be activated with use of trigger 4408. Yet, terminal 2000 can be operative so that a lens setting is movable responsively to an operator input command that is input intermediate first and second read attempts. Terminal 2000 can be operative to change the lens setting in accordance to an operator input command input subsequent to a first operator activated read attempt and prior to a second operator activated read attempt. Terminal 2000 can also be operative to automatically change a lens setting between operator activated read attempts. Terminal 2000 can be operative so that the first signal and the second signal are output during separate first and second operator activated read attempts of terminal 2000.

The first described functionality where terminal 2000 changes a lens setting between different lens settings during an operator activated read attempt, and the second described functionality where terminal 2000 maintains a lens setting at a certain setting through a read attempt can each be activated in response to an operator selected configuration selection. In one embodiment, terminal 2000 can have a plurality of operator selective configurations. With a first subset of the operator selected configurations, the first described functionality (lens setting changes during an operator activated read attempt) is active. With a second subset of the operator selected configurations, the second described functionality (lens setting remains the same during an operator activated read attempt) is active. Terminal 2000 can be operative so that there is a plurality of operator activated configurations of the first type and a plurality of operator activated configurations of the second type. Terminal 2000 can be operative so that an operator can select between various available configurations using the operator interface of terminal 2000, e.g., by selection of a button 5440, 5442, 5444, 5446, 5448, 5450, 5452, 5454, 5456 corresponding to the desired configuration.

Figure 4:
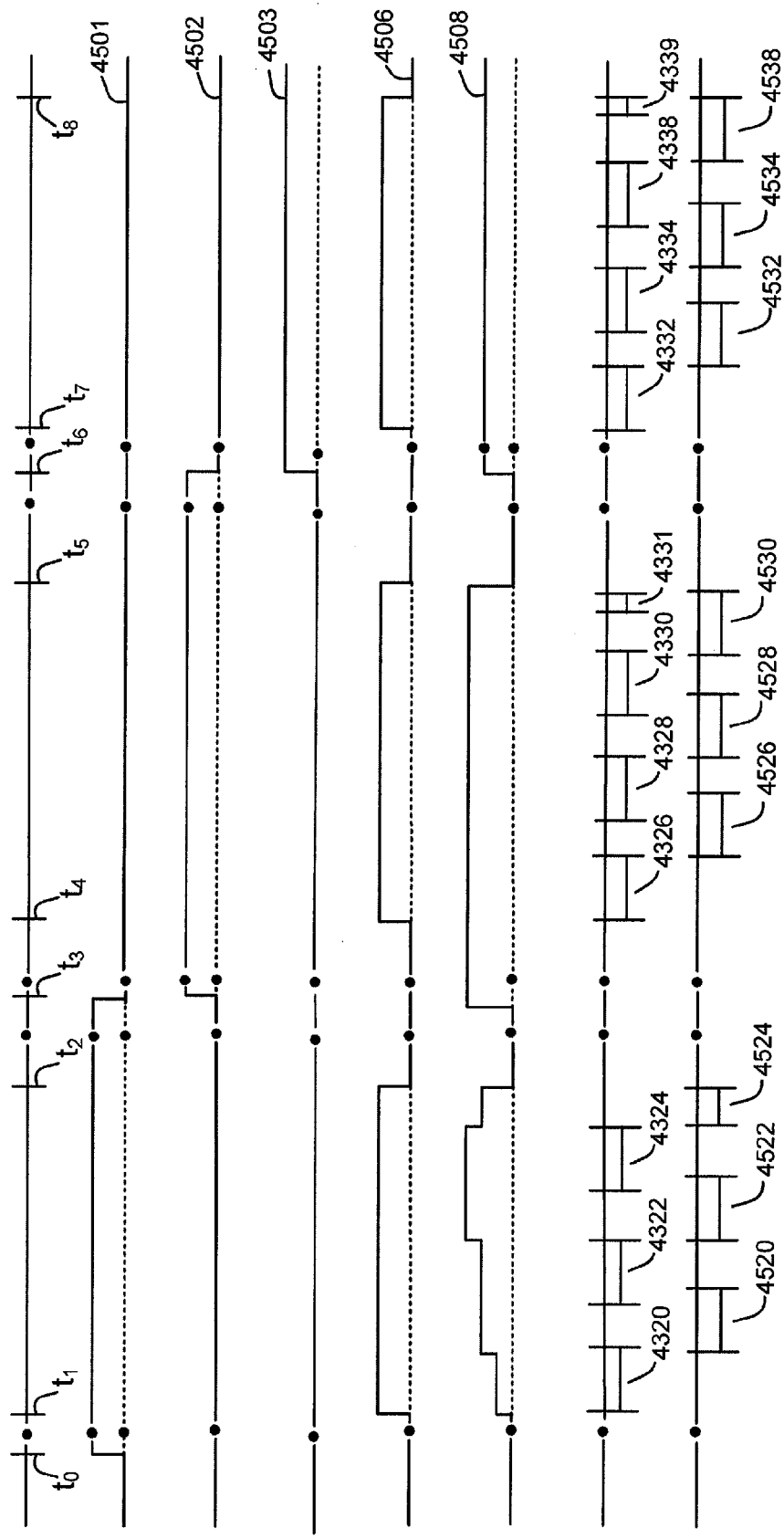
FIG. 4 is a timing diagram illustrating timing between various functions of a laser scanning indicia reading terminal in one embodiment.

A timing diagram further illustrating operation of terminal 2000 in one embodiment is shown in FIG. 4. The timing diagram of FIG. 4 illustrates terminal 2000 undergoing a change in configuration from a first configuration having the described functionality in which a variable lens assembly 200 of terminal 2000 is varied during a read attempt to a second configuration of the second described functionality in which a variable lens assembly 200 of terminal 2000 remains at a fixed setting throughout a read attempt, to a third configuration also of the second described functionality in which variable lens assembly 200 of terminal 2000 remains at a fixed setting throughout a read attempt.

Referring to the timing diagram of FIG. 4, signal 4501 is a state signal representing an active or inactive state of the first operator selectable configuration (moving lens setting). Signal 4502 is a state signal representing the state of a second described operator selectable configuration (fixed lens setting). Signal 4503 is a state signal representing the third described operator selective configuration (fixed lens setting also of the second functionality). Signal 4506 is a trigger signal which can be made active by actuation of trigger 4408, and which can be deactivated by releasing of trigger 4408. Trigger signal 4506 may become inactive, e.g., on expiration of a time out period or on completion of a successful decode of a decodable indicia, or on release of trigger 4408. Signal 4508 represents an energy input level input into lens assembly 200 of terminal 2000. Scanning periods 4320, 4322, 4324, 4326, 4328, 4330, 4331, 4332, 4334, 4338, and 4339 are scanning periods during which the described laser beam is scanned across a target for generation of a processable signal.

Referring to processing periods 4520, 4522, 4524, 4526, 4528, 4530, 4532, 4534, 4538, the noted processing periods can represent processing periods during which time CPU 2060 of terminal 2000 processes stored (e.g., buffered) digital signals representing reflected beams reflected from a target for attempting to decode a decodable indicia.

With further reference to the timing diagram of FIG. 4, an operator at time $t_1$ can select a first configuration using e.g., button 5448 so that terminal 2000 is set in a configuration in which a lens setting of lens assembly 200 will vary during a read attempt. At time $t_1$, an operator can activate trigger signal 4506 e.g., by actuation of trigger 4408. In response to trigger signal 4506 being activated terminal 2000 can generate a plurality of scan signals generated during scanning periods 4320, 4322, 4324, each representing light reflected from a target during a scan of a light beam thereacross.

Referring to the timing diagram of FIG. 4, the energy input level input for establishing a setting of lens assembly 200 is represented by signal 4508 may be at different levels during each of respective scanning periods 4320, 4322, 4324 when terminal 2000 operates in the first configuration described with reference to the timing diagram of FIG. 4. At time $t_2$, trigger signal 4506 can be deactivated e.g., by successful decode, by expiration of a timeout period or a release of trigger 4408. At time $t_3$, an operator can activate the second configuration as described herein e.g., by actuation of button 5444. Terminal 2000 can be operative so that activation of a subsequent configuration deactivates a previous configuration.

Referring to signal 4508, signal 4508 can be established at an energy level timeout corresponding to the selected lens setting. In one embodiment, a selection of a configuration in which the second described functionality is active can be regarded as a selected lens setting. Referring to the timing diagram of FIG. 4, selection of button 5444 establishes a fixed lens setting at a far plane of optimum focus distance for a next read attempt. At time $t_4$, a trigger signal 4506 can be activated again, e.g., by an operator actuation of trigger 4408. A plurality of scanning periods can ensue as seen by scanning periods 4326, 4328, 4330, 4331. When operating in the second configuration, an energization input level into lens assembly 200 as seen by signal 4508 and therefore a setting of lens assembly 200 can remain constant. At time $t_5$, trigger signal 4506 can be deactivated e.g., by a release of trigger 4408 or by a successful decode of a message.

At time $t_6$, a third configuration can be selected, e.g., by selection of button 5442. Terminal 2000 can be operative so that activation of the third configuration deactivates the second configuration. In response to activation of the third configuration, an energization level for establishing a setting of lens assembly 200 can change to a level correlated to the setting as is seen by signal 4508. In the particular example, selection of button 5442 establishes an intermediate plane of optimum focus distance lens settings. A trigger signal 4506 can thereafter be activated again at time $t_7$. A plurality of scanning periods 4332, 4334, 4338, 4339 can ensue with a lens setting remaining at a setting corresponding to the constant lens setting energization level during scanning periods 4332, 4334, 4338, 4339 represented by signal 4508 as seen in timing the diagram of FIG. 4. Technologies that are disclosed in U.S. patent application Ser. No. 12/432,517, entitled "LASER SCANNER WITH DEFORMABLE LENS," and U.S. patent application Ser. No. 12/432,534, entitled "LASER SCANNER WITH IMPROVED DECODING" each incorporated herein by reference in its entirety (including laser scanning based terminal technologies) can be used with systems, apparatuses, and methods described herein.

Mode, configuration, or setting selections described herein described as being made with use of a user (operator) interface comprising a display and pointer mechanism of terminal 2000 can also be made with use of another user interface, e.g., terminal 2000 can be operative to be reprogrammed by reading of programming bar code symbols, and a user interface can be regarded as being provided by reading of programming bar code symbols.

Various configurations of terminal 2000 are summarized in Table A. Table A summarizes operation of terminal 2000 in accordance with various configurations including those summarized, the configurations described in connection with FIG. 4. The "first" configuration corresponding to state signal 4501 described with reference to the timing diagram of FIG. 4 corresponds to configuration 9 summarized in Table A. The "second" configuration corresponding to state signal 4502, described with reference to the timing diagram of FIG. 4 corresponds to configuration 1 summarized in Table A (lens setting remains at a far plane of optimum focus setting through read attempts). The "third" configuration corresponding to state signal 4503, described with reference to the timing diagram of FIG. 4 corresponds to configuration 2 summarized in Table A (lens setting remains at an intermediate plane of optimum focus setting through read attempts). Configurations 5, 6, 7, 8, and 9 are configurations in accordance with the first type of functionality (changing lens setting, lens setting changing during read attempts) configuration while configurations 1, 2, 3, and 4 are configurations in accordance with the second type of functionality (fixed lens setting). From terminal design to terminal design, the distances designated as far, intermediate, near, and near contact can vary and the terminal can be operative so that an infinite number of focus distances intermediate of those specified are possible. Exemplary ones of such values are: far 762.00 cm (300"), intermediate 91.40 cm (36"), near 20.32 cm (8"), near contact 7.62 cm (3").

TABLE A

| CONFIG-URA-TION | SCAN 1 | SCAN 2 | SCAN 3 | SCAN 4 | SCAN 5 | SCAN 6 | SCAN 7 | SCAN 8 | SCAN 9 | SCAN 10 |
|---|---|---|---|---|---|---|---|---|---|---|
| 1 | SETTING: FAR | SETTING: FAR | SETTING: FAR | SETTING: FAR | SETTING: FAR | SETTING: FAR | SETTING: FAR | SETTING: FAR | SETTING: FAR | ... |
| 2 | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | SETTING: INTERMEDIATE | ... |
| 3 | SETTING: NEAR | SETTING: NEAR | SETTING: NEAR | SETTING: NEAR | SETTING: NEAR | SETTING: NEAR | SETTING: NEAR | SETTING: NEAR | SETTING: NEAR | ... |

TABLE A-continued

| CONFIG-URATION | SCAN 1 | SCAN 2 | SCAN 3 | SCAN 4 | SCAN 5 | SCAN 6 | SCAN 7 | SCAN 8 | SCAN 9 | SCAN 10 |
|---|---|---|---|---|---|---|---|---|---|---|
| 4 | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | SETTING: NEAR CONTACT | ... |
| 5 | SETTING: NEAR CONTACT | SETTING: NEAR | SETTING: INTERMEDIATE | SETTING: FAR | SETTING: INTERMEDIATE | SETTING: INTERMEDIATE | SETTING: INTERMEDIATE | SETTING: INTERMEDIATE | SETTING: INTERMEDIATE | ... |
| 6 | SETTING: NEAR CONTACT | SETTING: NEAR | SETTING: INTERMEDIATE | SETTING: FAR | SETTING: INTERMEDIATE | SETTING: NEAR | SETTING: NEAR CONTACT | SETTING: NEAR | SETTING: INTERMEDIATE | ... |
| 7 | SETTING: NEAR CONTACT | SETTING: NEAR | SETTING: INTERMEDIATE | SETTING: FAR | SETTING: NEAR CONTACT | SETTING: NEAR | SETTING: INTERMEDIATE | SETTING: FAR | SETTING: NEAR CONTACT | ... |
| 8 | SETTING: INTERMEDIATE | SETTING: FAR | SETTING: INTERMEDIATE | SETTING: NEAR | SETTING: NEAR CONTACT | SETTING: NEAR | SETTING: INTERMEDIATE | SETTING: FAR | SETTING: INTERMEDIATE | ... |
| 9 | SETTING: NEAR | SETTING: INTERMEDIATE | SETTING: FAR | SETTING: INTERMEDIATE | SETTING: NEAR | SETTING: INTERMEDIATE | SETTING: FAR | SETTING: INTERMEDIATE | SETTING: NEAR | ... |

Referring now to Table B, various association profiles of terminal 2000 are shown and described. With reference to Table B, terminal 2000 can be operative to have a profile of the set of profiles A*B*C*D*E* where "*" is a wild card designator designating any one of the subscripts associated with the character as shown in Table B. Terminal 2000 can be operative to always operate in a single profile of the set of profiles A*B*C*D*E* or else can be operative so that a particular active profile among a set of possible candidate profiles is operator selectable. Candidate profiles of the set of profiles A*B*C*D*E* can comprise a plurality of sub-profiles. A selected profile can include a selected sub-profile of each of several categories. In the described example, selection of a sub-profile in the A* category establishes a particular association (or lack of association) between a lens setting and a scan angle. Selection of a particular profile in the B* sub-profile category establishes a particular association (or lack of association) between a lens setting and a laser light source energization level. Selection of a particular profile in the C* sub-profile category establishes a particular association (or lack of association) between a lens setting and an amplifier gain control.

For allowing operator selection of a profile, terminal 2000 can be operative to have a selector feature as is described with reference to button 5602 of FIG. 3. Terminal 2000 can be operative so that by selection of button 5602, terminal 2000 can display profile selector window 5610. An operator can select a particular profile of the profile set A*B*C*D*E* by the selection of appropriate matrix buttons of window 5610. A highlighting of a particular button indicates an active state. In the particular operating state indicated to be active in FIG. 3, the profile $A_1B_0C_2D_0E_0$ happens to be active as indicated by the highlighted buttons of window 5610.

TABLE B

| Assoc. Profile | FAR | INTERMEDIATE | NEAR | NEAR CONTACT | COMMENTS |
|---|---|---|---|---|---|
| $A_0$ | SCAN ANGLE: 22.6° | SCAN ANGLE: 22.6° | SCAN ANGLE: 22.6° | SCAN ANGLE: 22.6° | Scan angle is unchanged at a constant wide scan angle setting irrespective of lens setting. |
| $A_1$ | SCAN ANGLE: 3.5° | SCAN ANGLE: 6.3° | SCAN ANGLE: 20.6° | SCAN ANGLE: 22.6° | Scan angle is increased for closer lens settings. |
| $A_2$ | SCAN ANGLE: 6.3° | SCAN ANGLE: 6.3° | SCAN ANGLE: 6.3° | SCAN ANGLE: 6.3° | Scan angle is unchanged at a constant narrow angle setting irrespective of lens setting. |
| $B_0$ | LLS ENERGY: $P = P_B$ | LLS ENERGY: $P = P_B$ | LLS ENERGY: $P = P_B$ | LLS ENERGY: $P = P_B$ | Laser light source energy level remains constant irrespective of lens setting. |
| $B_1$ | LLS ENERGY: $P = P_F$, $P_F > P_B$ | LLS ENERGY: $P = P_B$ | LLS ENERGY: $P = P_N$, $P_N > P_B$ | LLS ENERGY: $P = P_{NC}$, $P_{NC} < P_N$ | Illumination increases with longer best focus distance lens settings. |
| $B_2$ | LLS ENERGY: $P_o = P_F$, $P_F > P_B$ $P_i = f_{L1}(P_{i-1}, M_{i-1})$ | LLS ENERGY: $Po = P_B$ $P_i = f_{L1}(P_{i-1}, M_{i-1})$ | LLS ENERGY: $P_o = P_N$, $P_N < P_B$ $P_i = f_{L1}(P_{i-1}, M_{i-1})$ | LLS ENERGY: $P_o = P_{NC}$ $P_{NC} < P_N$ $P_i = f_{L1}(P_{i-1}, M_{i-1})$ | Laser light source energy determined according to different process depending on which lens setting is active. |
| $B_3$ | LLS ENERGY: $Po = PF$, $P_F > P_B$ $P_i = f_{L1}(P_{i-1}, M_{i-1})$ | LLS ENERGY: $P_o = P_B$ $P_i = f_{L2}(P_{i-1}, M_{i-1})$ | LLS ENERGY: $P_o = P_N$, $P_N < P_B$ $P_i = f_{L3}(P_{i-1}, M_{i-1})$ | LLS ENERGY: $P_o = P_{NC}$, $P_{NC} < P_N$ $P_i = f_{L4}(M_{i-1})$ | Laser light source energy determined according to different process depending on which lens setting is active and algorithm is differentiated depending on which lens setting is active. |

TABLE B-continued

| Assoc. Profile | FAR | INTERMEDIATE | NEAR | NEAR CONTACT | COMMENTS |
|---|---|---|---|---|---|
| $C_0$ | AMPLIFIER GAIN: $G = G_B$ | AMPLIFIER GAIN: $G = G_B$ | AMPLIFIER GAIN: $G = G_B$ | AMPLIFIER GAIN: $G = G_B$ | Gain unchanged regardless of lens settings |
| $C_1$ | AMPLIFIER GAIN: $G = G_F$, $G_F > G_B$ | AMPLIFIER GAIN: $G = G_B$ | AMPLIFIER GAIN: $G = G_N$, $G_N < G_B$ | AMPLIFIER GAIN: $G = G_{NC}$, $G_{NC} < G_N$ | Amplifier gain is increased at farther scanning distances. |
| $C_2$ | AMPLIFIER GAIN: $G_o = GF$, $G_F > G_B$ $G_i = f_{G1}(G_{i-1}, M_{i-1})$ | AMPLIFIER GAIN: $G_o = G_B$ $G_i = f_{G1}(G_{i-1}, M_{i-1})$ | AMPLIFIER GAIN: $G_o = G_N$, $G_N < G_B$ $G_i = f_{G1}(G_{i-1}, M_{i-1})$ | AMPLIFIER GAIN: $G_o = G_{NC}$, $G_{NC} < G_N$ $G_i = f_{G1}(G_{i-1}, M_{i-1})$ | Gain determined according to different process depending on which lens setting is active. |
| $C_3$ | AMPLIFIER GAIN: $G_o = G_F$, $G_F > G_B$ $G_i = f_{G1}(G_{i-1}, M_{i-1})$ | AMPLIFIER GAIN: $G_o = G_B$ $G_i = f_{G2}(G_{i-1}, M_{i-1})$ | AMPLIFIER GAIN: $G_o = G_N$, $G_N < G_B$ $G_i = f_{G3}(G_{i-1}, M_{i-1})$ | AMPLIFIER GAIN: $G_o = G_{NC}$, $G_{NC} < G_N$ $G_i = f_{G4}(M_{i-1})$ | Gain determined according to different process depending on which lens setting is active and algorithm is differentiated depending on which lens setting is active. |

As seen from Table B, selection of a certain sub-profile associates a particular control (e.g., an operational parameter, a process for determining an operational parameter, an algorithm for determining an operational parameter) to a particular lens setting so that in operation of terminal 2000, the particular control is active when the particular lens setting is active. If a particular scan width is associated to a particular lens setting, an expected scan will extend to the associated width when there is a scan executed with the lens setting active. If a particular process is associated to a particular lens setting, the particular process for detecting an operational parameter will be active when there is being determined an operative parameter for a scan having the associated lens setting. If a particular light energization level is associated to a particular lens setting, the terminal will control the light energization level to the particular level when there is association with the particular lens setting. If a particular gain is associated to a particular lens setting, the terminal will control the gain to the associated level when applying gain to a signal level of a scan signal generated corresponding to a scan executed with the lens setting set to the particular setting.

Additional features are now described with reference to particular sub-profiles that can be selected by an operator. Referring to sub-profile $A_1$, with sub-profile $A_1$ active, a scan width (expressed as an angle) is associated with and automatically varies with a lens setting. In general, as seen with reference to sub-profile $A_1$, a scan width is lengthened when a lens setting is a nearer plane of optimum focus and is shortened when a lens setting of lens assembly 200 is at a further plane of optimum focus. The availability of sub-profile $A_1$ is in recognition of the fact that at longer reading distances, a smaller scan width will be sufficient to span a width of a complete decodable indicia. By contrast, referring to sub-profile $A_1$, with sub-profile $A_0$ active a scan width of terminal 2000 remains at a constant width, irrespective of the lens setting of terminal. With sub-profile $A_0$ active, the scan angle which remains constant at 22.6° irrespective of the lens setting can be regarded as being disassociated with the lens setting. The lens setting can also be regarded as being disassociated with the lens setting with subprofile $A_2$ active. With subprofile $A_2$ active, scan angle remains constant at 6.3° irrespective of the lens setting.

Turning now to sub-profiles $B_0$, $B_1$, $B_2$, and $B_3$, the sub-profiles $B_0$, $B_1$, $B_2$, and $B_3$ relate to the control of an energization level of a light emitting laser light source of terminal 2000 such as light source 2012. In the development of terminal 2000, it was determined that it might be useful in some applications to vary a control of a light energization level with the present lens setting.

Referring to sub-profile $B_1$, a higher energization level for a terminal laser light source can be applied at farther lens settings irrespective of the actual terminal to target distance and lower light source energization levels are applied at shorter plane of optimum focus lens settings irrespective of the actual terminal to target distance. Thus, with longer plane of optimum focus lens settings, additional light can be emitted for illumination of a target for optimization of performance at terminal to target distances corresponding to the current lens setting. By contrast, referring to sub-profile $B_0$, with sub-profile $B_0$ active, an energization level applied to a terminal laser light source 2012 is constant at a baseline level $P=P_B$ irrespective of an active lens setting. Sub-profile $B_0$ might be selected for applications where it is desired to maintain constant light brightnesses of emitted light throughout operation of terminal 2000. A varying light emission level might be regarded as distracting in some applications, while desirable in others.

Referring to sub-profiles $B_2$ and $B_3$, with sub-profile $B_2$ active, an energization level of the terminal light emitting light source is not constant but rather is determined according to an algorithm. With sub-profile $B_2$ active, a light source energization level can have an initial value, $P_0$ established at a predetermined level with subsequent values P, (the value for each scan after the initial scan) determined on a scan by scan basis. As seen from Table B, the initial applied energization value $P_0$ can vary depending on the lens setting. That is, referring to sub-profile $B_2$, an initial applied energization level at the far lens setting is $P_0=P_F$, at the immediate lens setting, $P_0=P_B$, at the near lens setting $P_0=P_N$ and at the near contact setting $P_0=P_{NC}$ as is indicated in Table B.

Referring to subsequent energization levels for subsequent scans after an initial scan, the subsequent energization levels can be determined according to the function $f=f_{L1}$. Referring to function $f_{L1}$, function $f_{L1}$, is a function of the applied energization level for the previous scan $P=P_{i-1}$ and the amplitude level $M_{i-1}$ e.g., peak or average of the most recent scan signal. In one embodiment, i.e., light energization level for a next scan may be determined by increasing the most recently applied light source energization level by a predetermined amount if $M_{i-1}$ is below a target value, and decreasing that amount by a predetermined amount if the parameter $M_{i-1}$ is above a predetermined amount. In one embodiment, with reference to sub-profile $B_2$, the most recent scan for purposes of determining an energization level for a next scan may not be regarded as the most recent overall scan, but rather the most recent overall scan activated with the most current lens setting active. Thus referring to configuration 6 in Table A, the most recent scan relative to scan 9 for purposes of calculation of an energization level may not be regarded as being scan 8, but rather scan 5, the most recent scan with the intermediate lens setting active. Referring still to the example of sub-profile $B_2$, the same algorithm expressed as the function $f=f_1$ may be active for determination of an applied light source energization level irrespective of the current lens setting. However, the applied energization level at each lens setting may be quite different, first, because the initial energization level, $P_0$ is different for each lens setting with sub-profile $B_2$ active, and second because difference processes may be active for determining a subsequently applied laser light source energization level i.e., after initial energization level for each particular lens setting.

Different programs may be run by CPU 2060 for determination of an energization level to apply to a light emitting light source with each respective lens setting active. Terminal 2000 can be operative so that CPU 2060 executes a different processing thread for each light energization level determination process it is currently executing.

Referring now to sub-profile $B_3$, sub-profile $B_3$ is similar to sub-profile $B_2$ except that in addition to running different light energization level processes for each respective lens setting, the algorithms by which the processes are run are differentiated between various lens settings. Referring to the example of sub-profile $B_3$, the active algorithm with the far lens setting active is expressed by the formula $f=f_{L1}$. The active algorithm with the intermediate lens setting active is expressed by the function $f=f_{L2}$, the active algorithm corresponding to the near optimum focus distance lens setting is expressed by the function $f=f_{L3}$ and the active algorithm corresponding to the near contact optimum focus distance setting is expressed by the function $f=f_{L4}$ where $f_{L4}$ depends only on an amplitude of a most recent scan signal but not on a most recently applied light source energization level. In such an embodiment, the light source energization level can be determined by looking up a value from a lookup table, rather than incrementing or decrementing a recently applied value.

Turning now to sub-profiles $C_0$, $C_1$, $C_2$, and $C_3$, the sub-profiles $C_0$, $C_1$, $C_2$, and $C_3$ relate to the control of an amplifier gain for input to amplifier 261 for amplification of a scan signal. In the development of terminal 2000, it was determined that it might be useful in some applications to vary a control of an amplifier gain with the current lens setting.

Referring to sub-profile $C_1$, a higher gain level for a terminal amplifier gain can be applied at farther lens settings irrespective of the actual terminal to target distance and lower gain levels can be applied at shorter plane of optimum focus lens settings irrespective of the actual terminal to target distance. Thus, with longer plane of optimum focus lens settings there can be applied additional amplification of a scan signal. By contrast, referring to sub-profile $C_0$, with sub-profile $C_0$ active, an energization level applied to a terminal light emitting light source is constant at the baseline level $G=G_B$ for each possible lens setting. When sub-profile $C_0$ is active, the amplifier gain can, since it remains the same irrespective of lens settings, be regarded as being disassociated from the lens setting. Referring to sub-profiles $C_2$ and $C_3$, with sub-profile $C_2$ active, the gain applied is determined according to an algorithm. With sub-profile $C_2$ active, terminal 2000 can have an initial value $G_0$ and subsequent values $G_i$ (the gain for each subsequent scan signal) determined on a scan by scan basis. As seen from Table B, the initial applied gain value $G_0$ can vary depending on the lens setting. That is, referring to sub-profile $C_2$, an initial applied gain level at the far lens setting is $G_0=G_F$, at the immediate lens setting, $G_0=G_B$, at the near lens setting $G_0=G_N$ and at the near contact setting $G_0=G_{NC}$ as is indicated in Table B. Referring to subsequent gain levels for subsequent scans after an initial scan, the subsequent energization levels can be determined according to the function $f=f_{G1}$. Referring to function $f_{G1}$, function $f_{G1}$, is a function of the applied gain level for the previous scan $G=G_{i-1}$ and the amplitude level $M_{i-1}$, e.g., peak or average of the most recent scan. In one embodiment, with reference to sub-profile $C_2$, the most recent scan may not be regarded as the most recent overall scan, but rather the most recent overall scan executed with the most current lens setting active. Thus referring to configuration 6 in Table A, the most recent scan relative to scan 9 for purposes of calculation of a gain level may not be regarded as being scan 8, but rather scan 5, the most recent scan with the intermediate lens setting active. Referring still to the example of sub-profile $C_2$, the same algorithm expressed as the function $f=f_{G1}$ may be active for determination of an applied gain level irrespective of the current lens setting. However, the applied gain level at each lens setting may be quite different, first, because the initial gain level, $G_0$ is different for each lens setting with sub-profile $C_2$ active, and second because difference processes may be active for determining a subsequently applied gain level i.e., after an initial gain level for each particular lens setting.

Different programs may be run by CPU 2060 for determination of a gain level to apply to a light emitting light source with each respective lens setting active. Terminal 2000 can be operative so that CPU 2060 executes a different processing thread for each gain level determination process it is currently executing.

Referring now to sub-profile $C_3$, sub-profile $C_3$ is similar to sub-profile $C_2$ except that in addition to running different gain determination processes for each respective lens setting, the algorithms by which the processes are run are differentiated between various lens settings. The gain determining active algorithm active with the far lens setting active can be $f=f_{G1}$. The active algorithm with the intermediate lens setting active can be expressed by the function $f=f_{G2}$. The gain determination algorithm corresponding to the near optimum focus distance lens setting can be expressed by the function $f=f_{G3}$ and the algorithm active corresponding to the near contact optimum focus setting if the function $f=f_{G4}$ where $f_{G4}$ depends only on an amplitude of a most recent scan signal but not on a most recently applied light source energization level. In such an embodiment, a gain for a present scan signal can be determined by reference to lookup table without reference to a previously applied gain.

A small sample of systems methods and apparatus that are described herein is as follows:

A1. An indicia reading terminal comprising:

a laser light source for emission of laser light, wherein the terminal includes a scanning apparatus for scanning emitted laser light emitted from the laser light source across a target for generation of a scan signal;

a variable setting lens assembly for focusing the emitted laser light, the variable setting lens assembly having a first lens setting at which the emitted laser light has a first plane of optimum focus and a second lens setting at which the emitted laser light has a second plane of optimum focus;

wherein the indicia reading terminal is operative to execute a first scan during which the emitted laser light is scanned across the target with the lens assembly at the first lens setting and is further operative to execute a second subsequent scan during which the emitted laser light is scanned across the target with the lens assembly at the second lens setting, wherein the terminal is further operative to generate a first scan signal and a second scan signal, the first scan signal representing light reflected from the target during the first scan and the second scan signal representing light reflected from the target during the second scan;

wherein the indicia reading terminal is further operative to attempt to decode a decodable indicia by processing at least one of the first scan signal and second scan signal;

wherein the indicia reading terminal is further operative so that there is associated with the first lens setting a first scan width and further so that there is associated with the second lens setting a second scan width so that the first scan executed with the lens assembly at the first lens setting has a first scan width and further so that the second scan executed with the lens assembly at the second lens setting has a second scan width.

A2. The indicia reading terminal as set forth in claim A1, wherein the indicia reading terminal is operative so that the first scan and the second scan are executed during a single read attempt activated by an operator.

A3. The indicia reading terminal as set forth in claim A1, wherein the indicia reading terminal is operative so that the first scan and the second scan are executed on an open loop basis irrespective of a sensed condition.

A4. The indicia reading terminal as set forth in claim A1, wherein the indicia reading terminal is operative so that the first scan and the second scan are executed responsively to a sensed terminal to target distance.

A5. The indicia reading terminal as set forth in claim A1, wherein the terminal is further operative to execute a third scan during which the emitted laser light is scanned across the target with the lens assembly at a third lens setting, and wherein there is associated with the third lens setting a third scan width so that the third scan has a third scan width.

A6. The indicia reading terminal as set forth in claim A1, wherein there is associated with the first and second lens settings at least one control in addition to scan width, the additional control being an operational parameter.

A7. The indicia reading terminal as set forth in claim A1, wherein there is associated with the first and second lens settings at least one control in addition to scan width, the additional control being an operational parameter selected from the group consisting of an initial light source energization level, an initial amplifier gain, a light source energization level, and an amplifier gain level.

A8. The indicia reading terminal as set forth in claim A1, wherein there is associated with the first and second lens settings at least one control in addition to scan width, the additional control being a process selected from the group consisting of a light source energization level operational parameter process, and an amplifier gain determination operational parameter process.

B1. An indicia reading terminal comprising:

a laser light source for emission of laser light, wherein the terminal includes a scanning apparatus for scanning emitted laser light emitted from the laser light source across a target for generation of a scan signal;

a variable setting lens assembly for focusing the emitted laser light, the variable setting lens assembly having a first lens setting at which the emitted laser light has a first plane of optimum focus and a second lens setting at which the emitted laser light has a second plane of optimum focus;

wherein the indicia reading terminal is operative to execute a first scan during which the emitted laser light is scanned across the target with the lens assembly at the first lens setting and is further operative to execute a second scan during which the emitted laser light is scanned across the target with the lens assembly at the second lens setting, wherein the terminal is further operative to generate a first scan signal and a second scan signal, the first scan signal representing light reflected from the target during the first scan and the second scan signal representing light reflected from the target during the second scan;

wherein the indicia reading terminal is further operative to attempt to decode a decodable indicia by processing of at least one of a first scan signal and a second scan signal;

wherein there is associated with the first lens setting a first at least one control, and wherein there is associated with the second lens setting a second at least one control, the first at least one control selected from the group consisting of an operational parameter and a process for determining an operational parameter, the second at least one control selected from the group consisting of an operational parameter and a process for determining an operational parameter.

B2. The indicia reading terminal as set forth in claim B1, wherein the first and second at least one controls include a scan width operational parameter.

B3. The indicia reading terminal as set forth in claim B1, wherein the first and second at least one controls include an initial gain operational parameter.

B4. The indicia reading terminal as set forth in claim B1, wherein the first and second at least one controls include a process for determining an amplifier gain.

B5. The indicia reading terminal as set forth in claim B1, wherein the first and second at least one controls include a scan width operational parameter coupled with an additional control.

B6. The indicia reading terminal as set forth in claim B1, wherein the first and second at least one control include a control for controlling scan width.

C1. An indicia reading terminal comprising:

a laser light source for emission of laser light, wherein the terminal includes a scanning apparatus for scanning emitted laser light emitted from the laser light source across a target for generation of a scan signal;

a variable setting lens assembly for shaping the emitted laser light, the variable setting lens assembly having a first lens setting at which the emitted laser light has a first plane of optimum focus and a second lens setting at which the emitted laser light has a second plane of optimum focus;

wherein the indicia reading terminal is operative to execute a first scan during which the emitted laser light is scanned across the target with the lens assembly at the first lens setting and is further operative to execute a second scan during which the emitted laser light is scanned across the target with the lens assembly at the second lens setting, wherein the terminal is further operative to generate a first scan signal and a second scan signal, the first scan signal representing light reflected from the target during the first scan and the second scan signal representing light reflected from the target during the second scan signal;

wherein the indicia reading terminal is further operative to attempt to decode a decodable indicia by processing of at least one of the first scan signal and second scan signal;

wherein the indicia reading terminal is operative in a first operator selectable operating state and a second operator selectable operating state;

wherein the indicia reading terminal in the first operator selectable operating state is operative so that there is associated with the first lens setting a first scan width and further so that there is associated with the second lens setting a second scan width so that the first scan executed with the lens assembly at the first lens setting has a first scan width and further so that the second scan executed with the lens assembly at the second lens setting has a second scan width;

wherein the indicia reading terminal in the second operator selectable operating state is operative so that the first scan and the second scan have a common scan width.

D1. An indicia reading terminal comprising:

a laser light source for emission of laser light, wherein the terminal includes a scanning apparatus for scanning emitted laser light emitted from the laser light source across a target for generation of a scan signal;

a variable setting lens assembly for shaping the emitted laser light, the variable setting lens assembly having a first lens setting at which the emitted laser light has a first plane of optimum focus and a second lens setting at which the emitted laser light has a second plane of optimum focus;

wherein the indicia reading terminal is configured so that during an operator initiated read attempt the terminal is operative to execute a first plurality of scans with the lens assembly at the first lens setting and a second plurality of scans with the lens assembly at the second lens setting, wherein the terminal is further operative so that during the operator initiated read attempt the terminal switches a lens setting of the lens assembly active during a succession of scans from the first lens setting to the second lens setting and back to the first lens setting so that there are executed a succession of scans with an alternating pattern of lens setting associations;

wherein the indicia reading terminal is further operative so that when executing a process for determining an operational parameter to be applied for a next scan with the lens setting at the first lens setting, the terminal preferentially utilizes a prior scan signal having as an associated lens setting the first lens setting.

D2. The indicia reading terminal as set forth in claim D1, wherein the terminal when preferentially utilizing a prior scan signal having an associated lens setting the terminal discards a prior scan signal having as an associated lens setting the second lens setting.

D3. The indicia reading terminal as set forth in claim D1, wherein the process for determining an operational parameter is a process for determining an amplifier gain for a next scan.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. An indicia reading terminal, comprising:

a light source for emitting light;

a scanning apparatus for scanning the emitted light at a scan angle across a target;

a detector assembly for detecting reflected light and generating a scan signal for each scan;

a variable setting lens assembly having two or more lens settings for focusing the emitted light;

wherein the terminal is configured to execute each scan according to operational parameters, the operational parameters comprising the lens setting, the scan angle, an energization level for the light source, an amplification gain for amplifying the scan signal, and a bandwidth for processing the scan signal;

wherein the terminal is configured to execute one or more scans in accordance with a configuration selected from two or more configurations and a profile selected from two or more profiles;

wherein each configuration designates the lens setting for each of the one or more scans; and wherein each profile determines the operational parameters for a given scan based on the lens setting designated by the configuration setting for the given scan.

2. The indicia reading terminal of claim 1, wherein the variable setting lens assembly has a first lens setting for focusing the emitted light in a first plane, a second lens setting for focusing the emitted light in a second plane, a third lens setting for focusing the emitted light in a third plane, and a fourth lens setting for focusing the emitted light in a fourth plane.

3. The indicia reading terminal of claim 1, wherein at least one configuration designates different lens settings for at least two of the one or more scans.

4. The indicia reading terminal of claim 1, wherein at least one profile changes at least one operational parameter for a given scan based on the lens setting designated by the configuration setting for the given scan.

5. The indicia reading terminal of claim 1, wherein at least one profile changes the scan angle for a given scan based on the lens setting designated by the configuration setting for the given scan.

6. The indicia reading terminal of claim 1, wherein at least one profile changes the energization level for the light source based on the lens setting designated by the configuration setting for the given scan.

7. The indicia reading terminal of claim 1, wherein at least one profile changes the energization level for the light source for a given scan based on the energization level for the light source applied for a previous scan executed using the same lens setting at which the given scan is executed.

8. The indicia reading terminal of claim 1, wherein at least one profile changes the energization level for the light source for a given scan according to an algorithm, wherein the algorithm is the same for each lens setting.

9. The indicia reading terminal of claim 1, wherein at least one profile changes the energization level for the light source for a given scan according to an algorithm, wherein the algorithm used depends on the lens setting designated by the configuration setting for the given scan.

10. The indicia reading terminal of claim 1, wherein at least one profile changes the amplification gain for amplifying the scan signal based on the lens setting designated by the configuration setting for the given scan.

11. The indicia reading terminal of claim 1, wherein at least one profile changes the amplification gain for amplifying the scan signal based on the amplification gain for amplifying the scan signal applied for a previous scan.

12. The indicia reading terminal of claim 1, wherein at least one profile changes the amplification gain for amplifying the scan signal for a given scan based on the scan signal's peak or average amplitude for the previous scan executed using the same lens setting at which the given scan is executed.

13. The indicia reading terminal of claim 1, wherein at least one profile changes the amplification gain for amplifying the scan signal for a given scan according to an algorithm, wherein the algorithm is the same for each lens setting.

14. The indicia reading terminal of claim 1, wherein at least one profile changes the bandwidth for processing the scan signal based on the lens setting designated by the configuration setting for the given scan.

15. The indicia reading terminal of claim 1, wherein at least one profile changes the bandwidth for processing the scan signal for a given scan based on the bandwidth for processing the scan signal applied for a previous scan.

16. The indicia reading terminal of claim 1, wherein at least one profile changes the bandwidth for processing the scan signal for a given scan according to an algorithm, wherein the algorithm is the same for each lens setting.

17. An indicia reading terminal, comprising:
a light source for emitting light;
a scanning apparatus for scanning the emitted light at a scan angle across a target;
a detector assembly for detecting reflected light and generating a scan signal for each scan;
a variable setting lens assembly having two or more lens settings for focusing the emitted light;
wherein the terminal is configured to execute each scan according to operational parameters, the operational parameters comprising the lens setting, the scan angle, an energization level for the light source, an amplification gain for amplifying the scan signal, and a bandwidth for processing the scan signal;
wherein the terminal is configured to execute one or more scans in accordance with a configuration selected from two or more configurations and a profile selected from two or more profiles;
wherein each configuration designates the lens setting for each of the one or more scans;
wherein each profile determines the operational parameters for a given scan based on the lens setting designated by the configuration setting for the given scan; and
wherein at least one profile determines at least one operational parameter for a given scan based on the same operational parameter applied for a previous scan executed using the same lens setting at which the given scan is executed.

18. The indicia reading terminal of claim 17, wherein the variable setting lens assembly has a first lens setting for focusing the emitted light in a first plane, a second lens setting for focusing the emitted light in a second plane, a third lens setting for focusing the emitted light in a third plane, and a fourth lens setting for focusing the emitted light in a fourth plane.

19. The indicia reading terminal of claim 17, wherein at least one configuration designates the same lens setting for each of the one or more scans.

20. The indicia reading terminal of claim 17, wherein at least one profile changes at least one operational parameter for a given scan based on the lens setting designated by the configuration setting for the given scan.

21. The indicia reading terminal of claim 17, wherein at least one profile changes the scan angle for a given scan based on the lens setting designated by the configuration setting for the given scan.

22. The indicia reading terminal of claim 17, wherein at least one profile changes the energization level for the light source for a given scan based on:
the energization level for the light source applied for the previous scan executed using the same lens setting at which the given scan is executed; and
the scan signal's peak or average amplitude for the previous scan executed using the same lens setting at which the given scan is executed.

23. The indicia reading terminal of claim 17, wherein at least one profile changes the amplification gain for amplifying the scan signal for a given scan according to an algorithm, wherein the algorithm used depends on the lens setting designated by the configuration setting for the given scan.

24. The indicia reading terminal of claim 17, wherein at least one profile changes the bandwidth for processing the scan signal for a given scan based on the bandwidth for processing the scan signal applied for a previous scan executed using the same lens setting at which the given scan is executed.

25. An indicia reading terminal, comprising:
a light source for emitting light;
a scanning apparatus for scanning the emitted light at a scan angle across a target;
a detector assembly for detecting reflected light and generating a scan signal for each scan;
a variable setting lens assembly having a first lens setting for focusing the emitted light in a first plane and a second lens setting for focusing the emitted light in a second plane;
wherein the terminal is configured to execute each scan according to operational parameters, the operational parameters comprising the lens setting, the scan angle, an energization level for the light source, an amplification gain for amplifying the scan signal, and a bandwidth for processing the scan signal;
wherein the terminal is configured to execute one or more scans in accordance with a configuration selected from two or more configurations and a profile selected from two or more profiles;
wherein each configuration designates the lens setting for each of the one or more scans;
wherein each profile determines the operational parameters for a given scan based on the lens setting designated by the configuration setting for the given scan;
wherein at least one configuration designates different lens settings for at least two of the one or more scans; and
wherein at least one profile changes at least one operational parameter for a given scan based on the lens setting designated by the configuration setting for the given scan.

26. The indicia reading terminal of claim 25, wherein at least one profile changes the energization level for the light source based on the lens setting designated by the configuration setting for the given scan.

27. The indicia reading terminal of claim 25, wherein at least one profile changes the energization level for the light source for a given scan based on the energization level for the light source applied for a previous scan.

28. The indicia reading terminal of claim 25, wherein at least one profile changes the amplification gain for amplifying the scan signal for a given scan based on the amplification gain for amplifying the scan signal applied for a previous scan.

29. The indicia reading terminal of claim 25, wherein at least one profile changes the amplification gain for amplifying the scan signal for a given scan based on the amplification gain for amplifying the scan signal applied for the previous scan executed using the same lens setting at which the given scan is executed.

30. The indicia reading terminal of claim 25, wherein at least one profile changes the bandwidth for processing the scan signal based on the lens setting designated by the configuration setting for the given scan.

* * * * *